Figure 1:
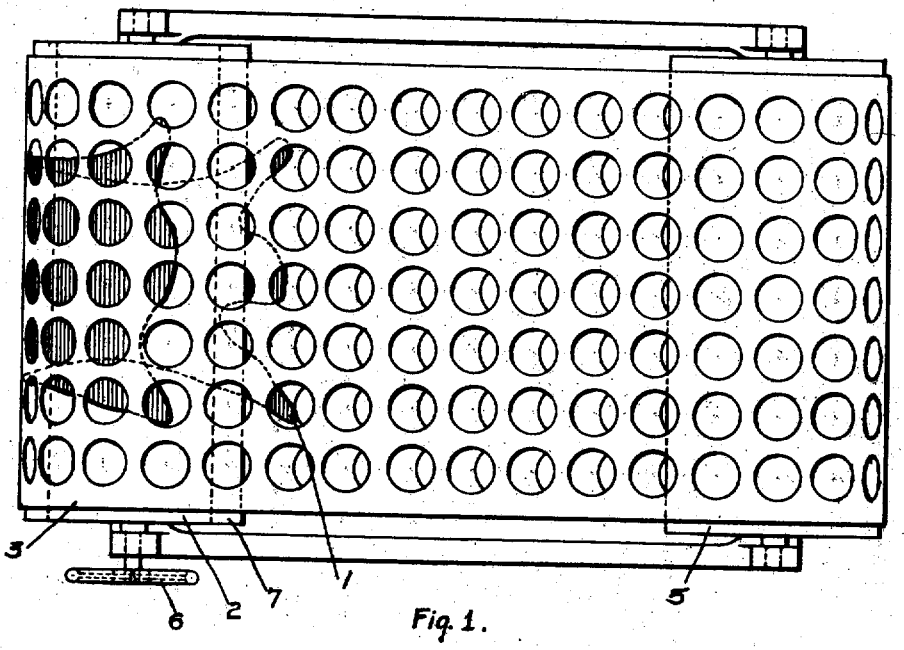

Jan. 8, 1924. Re. 15,744

M. H. REYMOND

PROCESS OF GAUGING LEATHER

Original Filed Aug. 11, 1921

INVENTOR.

Martin H. Reymond.

Reissued Jan. 8, 1924. Re. 15,744

UNITED STATES PATENT OFFICE.

MARTIN H. REYMOND, OF BINGHAMTON, NEW YORK.

PROCESS OF GAUGING LEATHER.

Original No. 1,437,683, dated December 5, 1922, Serial No. 491,633, filed August 11, 1921. Application for reissue filed February 15, 1923. Serial No. 619,286.

*To all whom it may concern:*

Be it known that I, MARTIN H. REYMOND, a citizen of the United States, residing at Binghamton, in the county of Broome and State of New York, have invented a certain new and useful Process of Gauging Leather, of which the following is a specification.

This invention relates to measuring the cutting value of leather in advance of cutting. More particularly, it relates to definitely predetermining the effect on the cutting value of the many variables that exists in leather, such as size of hide, shape of hide, raggedness of edge, tears, surface marks, brands, scars, grubs, cuts, creases, holes, grain texture, body texture, thickness, grain imperfections, color imperfections, finish imperfections, etc.

The principal object of this invention is to provide a convenient and economical process for definitely predetermining for any given supply of leather, for a given purpose, what its cutting value is compared to any other given supply of leather, taking into account the above mentioned variables.

Another object is to provide a particular form of apparatus whereby this process may be advantageously carried out.

It would of course be possible to predetermine what a given supply of leather would cut for by laying off on the surface the product it is intended to cut from it. But this would not only involve a prohibitive amount of labor, but would not be definite in that the varying human skill of the man doing the laying out would give varying results.

Previous to this invention, where any attempt has been made to predetermine the cutting quality of leather on a practical scale, this has been done by a general appraisal and sorting process. This usually consists of classifying each hide as grade No. 1, No. 2, No. 3, etc. by a glance over its surface, whereupon it is thrown upon a No. 1, No. 2, No. 3, etc. pile respectively. This gives very unreliable results. No two sorters will sort exactly alike, the human equation being a large factor. Nor will the same sorter sort alike on different occasions. For example, given poor leather to sort, his No. 1 leather will usually be a poorer grade than when sorting better leather. Further, not only is such sorting unreliable, but the segregation of good leather from poor leather often results in less economical cutting. For example, in the cutting of shoes, the cutters receiving the better end of the leather have an excess of clean leather which they must cut up into small parts such as tips, stays, etc. which they could just as well have obtained from poorer stock. On the other hand the cutters receiving the poorer end of the leather, in order to get the required number of large shoe parts, must use an excessive amount of leather, leaving a lot of available small part stock unutilized.

In contrast with the previous state of the art such as described, I attain the object of my invention, the determination of the comparative cutting quality of any supply leather, without sorting, and without needing any knowledge of the product to be cut beyond knowing what imperfections, if any, may satisfactorily appear in the finished product. Further, the human equation is eliminated in the result, the process being governed throughout by absolutely rigid conditions.

In general terms the process consists of: indicating over the surface of the leather regular-sized regularly-spaced areas; inspecting these areas in accordance with some fixed standard as to allowable imperfections; and, computing from the area of the leather and from the number of areas determined as the result of such inspection an index number as to the cutting quality.

In preferred form the process consists of: indicating over the surface of the leather small equal-sized equally-spaced areas; inspecting these small areas individually to determine whether they contain in any portion of their scope any imperfections such as previously mentioned which are not allowable in the finished product; counting the number of such small areas which contain no such imperfections; and, from the ratio of the area represented by this number of small areas to the total area of the leather they were obtained from, obtaining a measure of the cutting quality of the leather, or what may be termed the quality number of the leather.

Figure 2:
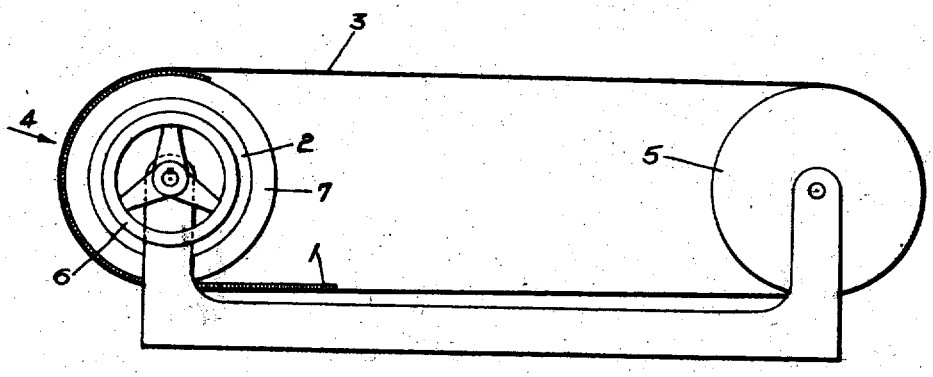

The accompanying drawing illustrates a particular application of this process. Figure 1 is a plan view of the apparatus, and Figure 2 is a side view. Similar numerals in the two views refer to similar parts.

The leather to be gauged 1, is shown partially intercepted between cylinder 2 and flexible perforated band 3. This band is perforated with equal-sized holes at equal distances over its surface, as shown. The man doing the grading stands at the front of cylinder 2 to inspect the various small areas. The arrow 4 indicates his approximate angle of vision. After he has inspected the areas he can conveniently see, he turns the two cylinders 2 and 5, together with band 3, and leather 1, by means of wheel 6, bringing the next region of small areas into convenient inspection position. The cylinder 2 has a soft rubber exterior 7, which serves two purposes. In the first place, it causes leather 1 to be snugly pressed against band 3 at every point, and in the second place it permits bending in the leather to aid in detecting spongy portions.

Assuming that upon inspection by this method, the following observations were obtained for the piece of leather 1:

| | |
|---|---|
| Number of whole areas containing no imperfections not allowable in the product | A |
| Total area of the piece of leather 1 | F sq. ft. |

The quality number of the leather would be A/F.

This quality number, however, in order to be in preferred form, would be varied slightly so as to always range between the extremes of .00 and 1.00. This will be the case if the total area F is expressed in units of the same size as the area represented by the holes in band 3. For example, if the band 3 contains one hole to every half square foot of surface, the total area of leather would have to be expressed in half square feet, and would be 2XF. This would make the quality number A/2XF.

If the area of the leather is not otherwise available, it may be obtained by counting the number of imperfect circles and the number of partial circles as well as the number of perfect circles. Thus:

Let number of perfect circles=A.
Let number of imperfect circles=B.
Let number of partial circles=C.

The partial circles will average to half a circle each and the quality number will be:

$$\frac{A}{A+B+C/2},$$

which will be the same value as if determined as described in the directly preceding paragraph.

This quality number may be obtained for an individual piece of leather or for a pile of hides. The larger the amount of leather inspected the more accurate this quality number will be, the errors balancing out according to the law of averages. For any considerable quantity of leather, the possible error is negligible. There will be no appreciable variation in quality numbers obtained from successive gaugings on the same lot of leather.

A better understanding of the above described quality number may be obtained by considering it from a slightly different viewpoint. Assume a given quantity of leather of known quality number. Imagine this leather to be cut up into small squares of the same area as the circles in band 3. Now suppose these squares are inspected for imperfections which may not appear in the product. Suppose the squares containing no such imperfections are sorted into one pile, and counted. Now suppose the ratio of the total area of these parts to the total area of the original leather is determined. This result will be identical with the quality number previously obtained. Thus, what is done in determining the quality number of leather is to determine, without actually cutting the leather, what the utilization would be if it were cut up mechanically under certain specific conditions, instead of in the usual manner of working around imperfections. While the cutting quality of the leather as actually cut, i. e. working around imperfections, does not vary directly with this quality number, it bears a certain relation to it. This relation may be determined by experiment for any given set of conditions, such as size of holes used in band 3, shape and size of pattern to be cut, kind of leather to be cut, etc.

Holes in band 3 should preferably be of a size comparable with the size of the parts to be cut, although no very close ratio need be adhered to. For example, a $\frac{1}{4}$ square foot hole may be used to gauge leather for cutting into parts which are only $\frac{1}{8}$ square foot in area without causing any large error.

It should be noted that considerable modifications are possible in the round, equal-sized, equally-spaced small areas shown in the drawing. Areas of different shape and differently spaced might be used. It would also be possible to use more than one size of area; for example, alternate larger and smaller areas might be used. The only basic requirements are, that where such alternations in size exist they occur in accordance with some definite rule, and that the spacing be likewise according to rule. Briefly stated such areas may be described as regular-sized regularly-spaced areas, as is done in this specification. The use of round areas of equal size and equally spaced is, however, a preferred form. In the first place defects are more readily observed in a figure containing no corners, the circle being the simplest figure of that kind. In the second place the spacing shown, where only part of the surface is visible, is of advantage in making each small area a segregated unit in as far as inspection is concerned, eliminating the psychological effect sometimes obtained in inspecting two directly adjacent areas of imagining the extension in prohibitive degree of a defect existing in one of these areas into the other. In the third place the inspection of only half of the surface reduces the work of inspection about one half, at the same time giving sufficiently accurate results for practical purposes. In the fourth place the inspection of only a part of the surface makes possible a simpler mechanical design of apparatus for indicating the desired areas on the leather than if the entire surface had to be inspected.

A further use of this process exists, where parts of two different qualities are cut from the same leather, in indicating what proportion of first quality and second quality parts should be produced. For example, assume that two qualities of shoes, each with definite requirements from the standpoint of allowable imperfections of the many kinds mentioned in the early part of this specification, are to be cut from a given supply of leather. Equal-sized, equally-spaced areas are indicated over the surface. These areas are inspected as to whether they contain any imperfections not allowable in first quality shoes, and those which do are inspected as to whether they contain any imperfections not allowable in second quality shoes. The number of areas suitable to each quality of shoes is counted. The relative proportion of these two quantities provides an index number as to the proportion of first and second quality parts which should be obtained.

While the particular processes described very well illustrate both the principle and uses of this invention, the full scope of the invention has more fully and concisely been embodied in the appended claims.

I claim as my invention:

1. The process of determining the cutting quality of leather, consisting of, indicating over its surface regular-sized regularly-spaced areas, inspecting these areas in accordance with some fixed standard as to allowable imperfections, and, from the area of the leather and from the number of areas determined as the result of such inspection computing an index number as to the cutting quality.

2. The process of determining the cutting quality of leather in the form of an index number, consisting of, indicating over its surface equal-sized equally-spaced areas, inspecting these areas in accordance with some fixed standard as to allowable imperfections, counting the number of areas coming up to such standard, and, computing the proportion of the area of said leather represented by said number of areas.

3. The process of determining the cutting quality of leather in the form of an index number, consisting of, indicating over its surface round equal-sized equally-spaced areas, inspecting these areas in accordance with some fixed standard as to allowable imperfections, counting the number of areas coming up to such standard, and computing the proportion of the area of said leather represented by said number of areas.

4. The process of determining the cutting quality of leather, consisting of, inserting it under a screen perforated with regular-sized regularly-spaced holes, inspecting the areas indicated thereby over the surface of the leather in accordance with some fixed standard as to allowable imperfections, and, from the area of the leather and from the number of areas determined as the result of such inspection computing an index number as to the cutting quality.

5. The process of determining the cutting quality of leather in the form of an index number, consisting of, inserting it under a screen perforated with equal-sized equally-spaced holes, inspecting the areas indicated thereby over the surface of the leather in accordance with some fixed standard as to allowable imperfections, counting the number of areas coming up to such standard, and computing the proportion of the area of said leather represented by said number of areas.

6. The process of determining the cutting quality of leather in the form of an index number, consisting of, inserting it under a screen perforated with round equal-sized equally-spaced holes, inspecting the areas indicated thereby over the surface of the leather in accordance with some fixed standard as to allowable imperfections, counting the number of areas coming up to such standard, and, computing the proportion of the area of said leather represented by said number of areas.

7. The process of determining the cutting quality of leather of unknown area, consisting of, indicating over its surface regular-sized regularly-spaced areas, inspecting these areas in accordance with some fixed standard as to allowable imperfections, counting the number of areas coming up to such standard, determining the area of said leather from the total areas indicated over its surface, and, computing from the area of the leather and from said number of areas coming up to said standard an index number as to the cutting quality.

8. The process of determining the cutting quality of leather, consisting of, inserting it between an elastic surface and a screen perforated with regular-sized regularly-spaced holes, inspecting the areas indicated thereby over the surface of the leather in accordance with some fixed standard as to allowable imperfections, and, from the area of the leather and from the number of areas determined as the result of said inspection computing an index number as to the cutting quality.

9. The process of determining in the form of an index number the relative proportion of products of two different quality requirements to be cut from leather, consisting of, indicating over the surface of the leather regular-sized regularly-spaced areas, inspecting these areas in accordance with two fixed standards as to allowable imperfections corresponding to the two qualities of product, counting the number of areas coming up to the first quality standard, counting the number of remaining areas coming up to the second quality standard, and, computing the relative proportion of said number of first quality and said number of second quality areas.

MARTIN H. REYMOND.